United States Patent [19]
Åkerberg

[11] Patent Number: 4,731,812
[45] Date of Patent: Mar. 15, 1988

[54] INSTALLATION WITH PORTABLE, WIRELESS TELEPHONE SETS

[75] Inventor: Dag E. Åkerberg, Järfälla, Sweden

[73] Assignee: Telefonaktiebolaget LM Ericsson, Stockholm, Sweden

[21] Appl. No.: 12,126
[22] PCT Filed: May 6, 1986
[86] PCT No.: PCT/SE86/00210
  § 371 Date: Dec. 19, 1986
  § 102(e) Date: Dec. 19, 1986
[87] PCT Pub. No.: WO86/06915
  PCT Pub. Date: Nov. 20, 1986

[30] Foreign Application Priority Data
May 9, 1985 [SE] Sweden .............................. 8502319

[51] Int. Cl.⁴ .............................................. H04Q 7/04
[52] U.S. Cl. .......................................... 379/61; 379/62
[58] Field of Search ................ 379/61, 62, 60; 455/33

[56] References Cited

U.S. PATENT DOCUMENTS

| | | | |
|---|---|---|---|
| 4,457,018 | 6/1984 | Takayama | 455/33 |
| 4,481,382 | 11/1984 | Villa-Real | 379/61 |
| 4,608,711 | 8/1986 | Goldman | 458/33 |
| 4,628,152 | 12/1986 | Akerberg | 379/51 |
| 4,658,416 | 4/1987 | Tanaka | 379/57 |
| 4,659,878 | 4/1987 | Dinkins | 370/71 |
| 4,661,970 | 4/1987 | Akaiwa | 379/61 |
| 4,675,863 | 6/1987 | Paneth et al. | 370/50 |
| 4,682,350 | 7/1987 | Akerberg | 379/61 |

FOREIGN PATENT DOCUMENTS

| | | | |
|---|---|---|---|
| 8400455 | 2/1984 | European Pat. Off. | 379/61 |
| 0195330 | 11/1983 | Japan | 379/61 |

Primary Examiner—Robert Lev
Attorney, Agent, or Firm—Roberts, Spiecens & Cohen

[57] ABSTRACT

In an installation containing at least one stationary unit (5) with a radio transmitter and a radio receiver, both with short range, and at least one, and preferably several portable, wireless telephone sets (4) with a radio transmitter and a radio receiver, both with short range, for exchanging telephone messages with one of the stationary units in the installation (1, 2, 3) the stationary units (5) are each adapted to exchange telephone calls simultaneously with more than one portable telephone set (4) on radio speech channels, adaptively selected among a plurality of radio speech channels common to all radio transmitters (9, 31) and radio receivers (10, 32). There is also included a radio exchange (6) to which the stationary units (5) are connected, this radio exchange being adapted to switch a telephone call having decreasing intelligibility between a portable telephone set (4B) and a first stationary unit (5A) to a telephone call with increasing intelligibility between the same portable telephone set and a second stationary unit (5B). A compressor (20, 41) coacts with each of the radio transmitters (9, 31) for time-compressing the speech signals, and an expander (12, 42) coacts with each of the radio receivers (10, 32) for time-expanding the speech signals.

10 Claims, 6 Drawing Figures

INSTALLATION WITH PORTABLE, WIRELESS TELEPHONE SETS

FIELD OF INVENTION

The invention relates to installations with portable, wireless telephone sets.

BACKGROUND

Installations are known which include portable, wireless telephones and which include one or more stationary units connected to a telephone network, the portable telephones being in radio communication with these stationary units. In the installation, there are one or more pairs of portable telephone and stationary units, the rage of radio communication being limited, for example, to an apartment or house. An installation built in this way is well suited for use in dwellings, both in single-family houses and in large apartment houses. Installations of this kind are described in SE-B-8107663-0.

Adaptive channel selection is described in this publication. In each of the units, there is selected from a radio speech channel which is idle and is selected among a plurality of radio speech channels, common to all pairs. It will thus be unnecessary to plan assigning of frequencies to the wireless telephone sets.

Even earlier mobile telephone systems are known in which mobile telephones, often in automobiles, can be put into radio communication with one of a plurality of fixed radio stations. Such type of fixed station transmits on a plurality of assigned radio frequencies, adjacent fixed stations being assigned other frequencies so that disturbance or noise is avoided. Should a corresponding principle for frequency assigning be used for the portable, wireless telephones as intended in the present invention, the administration of the frequency assignment would be extremely cumbersome and the frequency economy poor.

In a large office block, the concentration of portable telephones tends to be severe, and there may be the demand that a user of a portable telephone must carry the telephone with him within the entire office block. The relation between portable telephone and stationary unit will be looser than in the case described earlier. A given stationary unit can not service a portable telephone everywhere in the large block since the transmitting power of both telephone set and stationary unit must be kept down in consideration of noise.

SUMMARY OF INVENTION

According to the invention, there is arranged in an installation (e.g. in an office block) at least one stationary unit, preferably several, with a radio transmitter and a radio receiver, and at least one, and preferably several, portable, wireless telephone sets with a radio transmitter and a radio receiver for exchanging telephone communications with one of the stationay units in the installation. Normally, the number of portable sets is greater than the number of stationary units. The stationary units are connected via a radio exchange to an office PABX telephone exchange, and via this to a telephone network.

The radio transmitters in the stationary units and in the portable telephone sets have a very short range, e.g., 20–50 m. It is thus possible to reuse radio speech channels at different places in an installation. Each radio transmitter has access to all radio speech channels.

When the connection of a radio speech is made, there is selected by automatic adaptive channel selection a channel which is unoccupied for the moment, i.e. a channel which is not subject to noise at the location of the telephone set or the stationary unit. Planning channel distribution to the portable telephone sets will thus be necessary.

It may be expected that a portable telephone will be carried throughout the entire office block. If one of these sets is moved while it is being used for a speech, so that the distance between it and the stationary unit it was first in communication with increases, the intelligibility of the call decreases since all radio transmitters and radio receivers only have a short range. Instead, the portable telephone approaches another stationary unit which can provide a better connection. The radio exchange is adapted to monitor the quality of the connections and to switch over the call as required from a stationary unit to another which can give a better connection. This process is known as call hand-over.

All the radio transmitters, both those in the stationary units and those in the portable telephone sets, are adapted to transmit radio signals on a ringing signalling channel common to all the radio transmitters in the installation. To insure reception of the calling signals without interference, they are sent with time lag so that adjacent transmitters will not send calling signals simultaneously.

All the radio transmitters are adapted to send the telephone messages on a radio speech channel assigned to each particular radio transmitter as necessary, this channel having been arranged by frequency division (FDMA) or by time division (TDMA). In the latter case, the channel is a time slot among several in a repeated time frame. The time frame contains a plurality of time slots, each of which may be used as a speech channel for transmitting a telephone call; and several telephone calls can thus be in progress at the same time. A time-compresed part of a call is sent in each time slot and, on reception, the part is expanded to normal time extension. Time compression and expansion of telephone calls are known per se, e.g. from the description in SE-A-8204187-2.

In the case where the installation is arranged with time division (TDMA), all the radio transmitters are adapted to send the time frames modulated on a radio frequency common to all the radio transmitters. The radio channel thus used is therefore wideband. By using only one radio frequency, there is achieved a simplification in the frequency setting of the transmitters and receivers and a more complicated frequency synthesis is avoided.

The transmission of time frames from the radio transmitters of the stationary units is synchronized by signals from the radio exchange, and the transmission of the time frames from the radio transmitters of the portable telephone sets is synchronized to the transmission of the stationary unit radio transmitters with the aid of signals included in the transmission of these transmitters. All the transmission of time frames in the entire installation is thus synchronized, which is detected in the telephone receiver.

Time compression of a telephone call and expanding it is done to advantage with digital signals. According to one development of the invention, the radio transmitters and radio receivers are adapted for exchanging digitally coded telephone messages.

Ringing signals from the stationary units to the portable telephone sets are sent over the radio transmitters in all stationary units in an installation. A telephone call can thus reach its receiver anywhere in the installation. The calling signal process also leads to enabling the installation to be used for personal paging.

In one development of the invention, portable wireless apparatus of a second kind may be included in the installation, and adapted solely to give a signal with a sound generator or the like on receiving a calling signal.

The radio receivers in the portable telephone sets are adapted to save current by repeatedly and for short duration connecting the receivers for receiving calling signals which are repeatedly and for short duration sent from the stationary units, the connection time of the sets being somewhat longer than the time for a signalling call.

In accordance with the invention, a system is composed of several intallations, each installation containing what has been described above with reference to time division. The installations can be associated with different offices for different firms. In order that interference in the boundary zone between adjacent installations may be avoided, the transmission of time frames in all the installations must be performed synchronously. For this purpose, a central transmitter is arranged to send a second synchronizing signal to all installations, and the radio exchanges of all installations are adapted to receive this second synchronizing signal for synchronizing the time frames of all the installations. Each radio exchange is provided with a radio receiver for receiving the second synchronizing signal sent by radio, in alternative systems the second synchronizing signal is sent on a line.

By sending the second synchronizing signal to the radio exchanges and sending the previously mentioned synchronizing signal from the radio exchanges to the portable telephone sets, there is achieved that all transmission of time frames in the whole system takes place synchronously so that disturbances may be avoided.

It has been previously described that the calling signals in an installation are sent with time lag to insure interference-free reception of them. However, it is not possible simply to avoid each collision on the common radio signalling channel in a boundary zone between installations laying close to each other. The collision risk is, however, very low and may be estimated as less than 1%. For one percent of all calling signals, an acknowledgement thereof is thus not obtained immediately, and the signal must be repeated, which is quite acceptable. During a rush-hour period, calling signals are sent out in the system approximately three times. The calling signal channel has a capacity of 30 signals per second. If, for example, there are as many as 1000 portable telephones in installations adjacent local installation, the radio signalling channel is occupied during about 3% of the time. This degree of occupation is only troublesome in the boundary areas where the transmitters of neighbouring installations give stronger field strength than the local transmitters, and this applies in at most 10% of the covering area of the local intallation. The risk of a calling signal having to be repeated is estimated at less than 0.3%.

In a further development of the installation in accordance with the invention, the stationary units are adapted to transmit calling signals to the wireless telephone sets on the radio speech channels which are in used for the moment, instead of on the common radio signalling channel, and the telephone sets are adapted to be locked in the inactive state to one of the radio speech channels in use for receiving calling signals on this speech channel. For this reason, the stationary units are adapted continuously to send messages on at least one radio speech channel and, if there is no telephone message to send, thay send a fictitious message.

The radio frequency for transmitting the time frames, as well as the radio signalling channel is to advantage common for all installations in the entire system. Furthermore, the set of radio speech channels is common to all installations in the entire system.

BRIEF DESCRIPTION OF DRAWINGS

An example of an installation and a system of installations in accordance with the invention is next described as an example with reference to the accompanying drawings wherein.

DETAILED DESCRIPTION

Figure 1A:
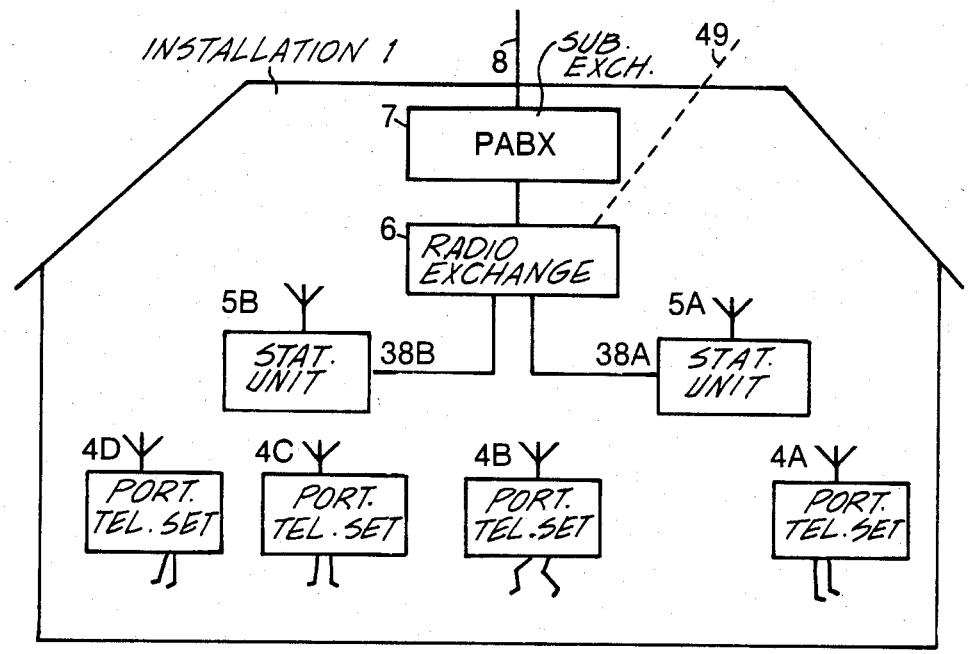
FIGS. 1A, 1B, and 1C are block diagrams of respective installations according to the invention.
Figure 1B:
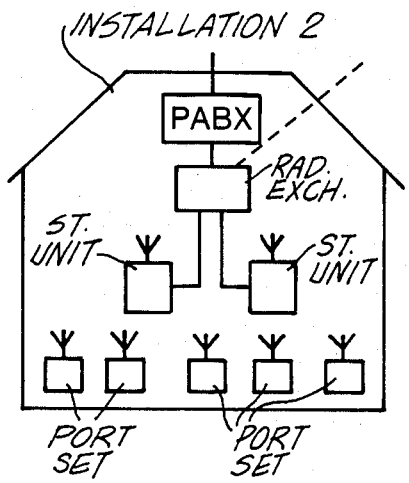
Figure 1C:
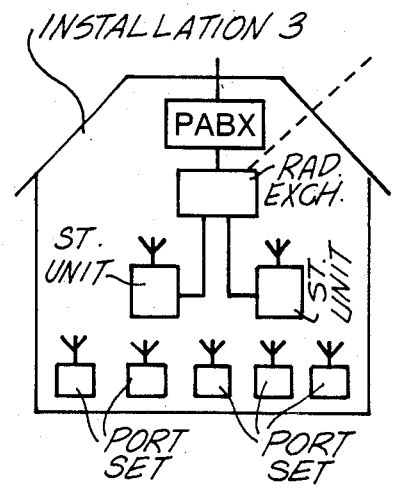

In an example of a system of installations in accordance with the invention as illustrated in FIGS. 1A, 1B and 1C, there may be included different numbers of installations with portable radio sets and stationary units. However, the number of installations is greater than one. In the described example, there are three installations 1, 2, and 3, as shown respectively in FIGS. 1A, 1B and 1C. The number of portable telephone sets and stationary units in each installation may be selected with great freedom of choice.

What is illustrated in FIGS. 1A, 1B, and 1C as an installation accommodated in a house is intended to be useful as an office for a firm, even though the firm is divided into several office and factory buildings in an area. What is described in the following concerning the installation 1 in FIG. 1A is applicable to all other installations in the system.

In installation 1 in FIG. 1A in accordance with the invention, there are included in the illustrated example four portable, wireless telephone sets 4A, 4B, 4C, 4D. The telephone sets may be put into radio communication with either of two stationary units 5A, 5B. The stationary units are connected by a line to a radio exchange 6 and this is connected to the installation PABX subscribers' exchange 7, which is connected by a telephone line 8 to a public telephone network. In one embodiment, calls between portable telephones are passed on by the radio exchange 6 without the intermediary of the PABX 7.

The portable telephone sets 4 and the stationary units 5 are each provided (see FIG. 2) with a radio transmitter 9 and a radio receiver 10 for transmitting telephone calls in two directions, in duplex, between themselves. The radio transmitters and receivers have a short range for avoiding disturbance on similar peripheral installations, and it is assumed that the installation 1 in the example has an extension so great in relation to the range of the transmitters that one stationary unit is not sufficient for servicing the installation, it being assumed that two stationary units 5A and 5B are needed for this example.

The number of portable telephone sets 4 in an installation is greater than the number of statonary units 5. The stationary units are adapted simultaneously to exchange telephone calls with more than one portable telephone set.

Figure 2:
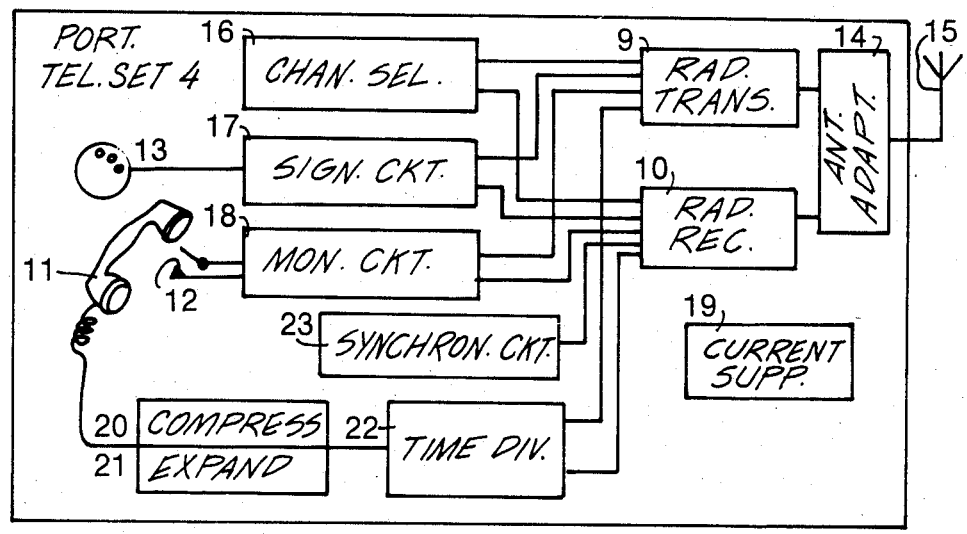
FIG. 2 illustrates a block diagram of a wireless telephone set.

Each of the telephone sets 4 included in the installation, FIG. 2, is portable and is implemented such that the handling of it functions as a normal telephone set, even if it differs from the latter in its appearance. In the telephone set 4 there is included a microtelephone 11, a receiver contact 12 and a number selector 13. Further included are the radio transmitter 9, the radio receiver 10, and an antenna adapter 14 and an antenna 15. Also part of the set 4 are a channel selector 16, logical circuits for signalling 17 and for monitoring 18 and a current supply part 19 with batteries. In the described respects the wireless telephone sets are comparable with the wireless telephone set described in the patent application mentioned in the introduction.

Further included in the wireless telephone set there is a compressor 20 for time-compressing speech signals before they are sent by the radio transmitter, and an expander 21 for time-expanding time-compressed speech signals received by the radio receiver before these are related by the micro telephone 11. The speech signals from the micro telephone are converted to digital form before they are compressed in the compressor 20 and received speech signals compressed in digital form are converted after the expansion in the expander 21 to analogue signals. The radio transmitter 9 and radio receiver 10 are adapted to transmit and receive digitally coded radio signals.

The speech signals are sent from the wireless telephone set (i.e., the set 4A in FIG. 1A), to the stationary unit 5A in time compressed form with time division TDMA (i.e., in a time slot in a repeated time frame) and, in a corresponding manner, compressed speech singals are sent from the stationary unit 5A to the telephone set 4A in another time slot in the same time frame. All time signals are sent in a corresponding way between the stationary unit 5A and the telephone set 4B, between the stationary unit 5B and the telephone set 4C and between the stationary unit 5B and the telephone set 4D, all calls being in separated time slots in a single time frame which is common for the entire installation.

All the radio transmitters have a short range, 20–50 m, and it is therefore practically possible for double use of a time slot in the radio transmitters situated at a distance from each other.

Fitting the call signals in a suitable time slot in the time frame is controlled by a time divider 22 arranged in the telephone set, and it has its time division controlled by a synchronizer 23, which in turn is adapted to receive synchronizing signals from the radio receiver 10. The synchronizing signals are sent by radio from the stationary unit 5 and are originally generated in the radio exchange 5, as will be described hereinafter.

Figure 3:
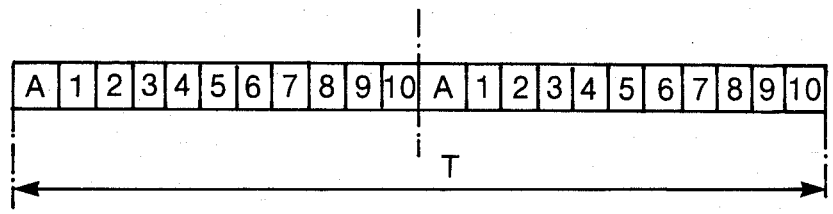
FIG. 3 illustrates a chart of a time frame with time slots.

The repeated time frame has a length which is not longer than the delay it causes of the speech, and, as will be seen from FIG. 3, it has an extention T of about 30 ms. The time frame accommodates time slots (e.g., 10 time slots for sending from the stationary unit and 10 time slots for sending from the portable telephone) as well as time slots A for sending calling signals from both stationary units and portable telephones. For 32 kbits/sec real time for digital speech signals, there is required a total of about 750 kbits/sec transmission rate.

Figure 4:
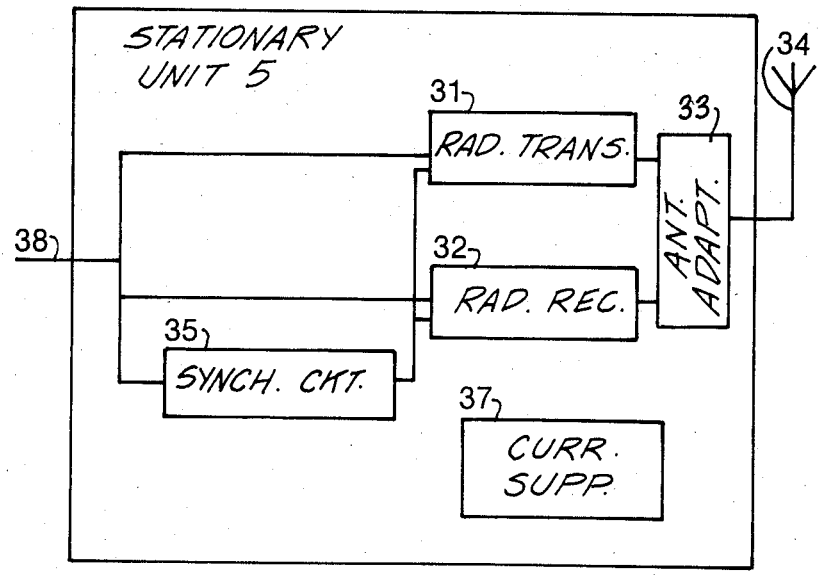
FIG. 4 illustrates a block diagram of a stationary unit.

In each of the stationary units 5, as shown in FIG. 4, there are included a radio transmitter 31 and a radio receiver 32, an antenna adapter 33 and an antenna 34. Furthermore, there is included a synchronizer 35 which is adapted to control the connection times of the transmitter 31 in response to a signal from the radio exchange 6, as well as a current supply part 37. The stationary unit is connected to the radio exchange 6 by a line 38, on which the time frames with the digital information, as shown in FIG. 3, are sent on the base band.

The radio transmitter 31 and radio receiver 32 are adapted to modulate and transmit or receive and demodulate digitally coded signals. Conversion from digital to analog speech signals and vice versa take place in the radio exchange which is described hereinafter. In other embodiments of the invention, all the radio transmitters 9, 31 and radio receivers 10, 32 are adapted to send and receive radio signals in analog form.

Figure 5:
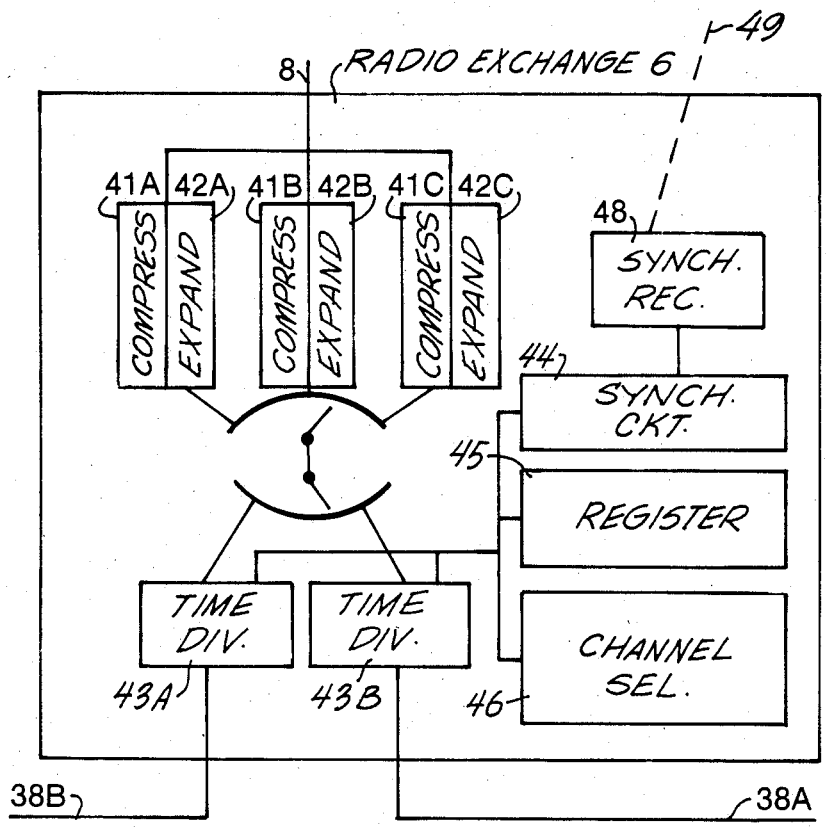
FIG. 5 illustrates a block diagram of a radio exchange.

The radio exchange 6, as shown in FIG. 5, includes, for each branch of the line 8 (there are three here) from the PABX 7, a compressor 41 for time compression of the speech signals which are going to be sent, an expander 42 for expanding received time compressed speech signals. For each of the connected stationary units 5 (there are two here) there is a time divisor 43 for directing transmission and reception of speech signals in the correct assigned time slots in the time frames. There is further included a control logic with channel selector 46, adapted to process the signals relating to connection, disconnection and engagement which are normally exchanged between a telephone exchange and a telephone set connected thereto, in this case between the PABX 7 and the portable telephone sets 4.

A synchronizer 44 in the radio exchange is adapted to control the transmission of the time frames so that their transmission is simultaneous in the entire installation. The signals are exchanged between the radio exchange 6 and the stationary units 5 via the line 38 B.

A calling signal from the stationary unit 5 to one of the portable telephone sets 4 is sent from all the radio transmitters in the stationary units. Accompanying the calling signal, there is an indication of which stationary unit is sending the calling signal in order to clarify to which stationary unit the portable apparatus should be connected. In areas where calling signals from two separate stationary units can be recognized, the interference could disturb the reception of the calling signal in the portable telephone set. In order to avoid this interference the calling signals of the separate stationary units are sent in separate successive time frames. The time frames have such a short extent in time that the delay for the calling signals will be insignificant.

If one of the portable telephone sets (i.e., 4B which is used for a telephone call via the stationary unit 5A) is moved so that the distance is increased between them, the intelligibility of the speech is decreased due to the radio transmitters and radio receivers in this station only having a short range. It is assumed that the portable telephone set 4B approaches the stationary unit 5B instead so that radio communication between these two would be acceptable. The radio exchange 6 is adapted, inter alia with a register 45 for audibility to enable it to monitor connection quality and in the described case to switch over the call with the portable telephone set 4B from the stationary unit 5A to the stationary unit 5B. This function is called "call hand-over", and an example thereof is described in British patent application GB No. 1,440,620, thus making any exhaustive description here superfluous.

The radio receivers 10 in the portable telephone sets 4 are adapted for saving current by repeatedly and for short duration switching on the receivers for receiving calling signals, repeatedly and for short duration transmitted from the statonary units 5. Such current saving is known, i.e., in its described patent application SE-C-No. 7,115,641-8, any further description therefore being superfluous.

Figure 6:
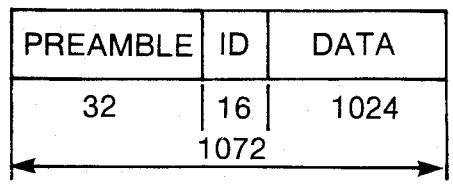
FIG. 6 illustrates a chart of the content of a time slot.

In an alternative novel installation, the stationary units 5 are adapted for sending calling signals to the wireless telephone sets 4 on the radio speech channels. A time slot in the installation in the example contains, as will be seen from FIG. 6 a preamble of 32 bits with the help of which the receiver 10 of the telephone set will be synchronized to the transmission, an identity section (ID) of 16 bits with information as to the stationary unit identity, and a message section (DATA) of 1024 bit. All of this adds up to 1072 bits.

The radio transmitter 31 (see FIG. 4) in each stationary unit 5 is set to send on at least one radio speech channel, i.e. in at least one time slot in the time frame. When there is a calling signal to be sent, it is inserted in the time slot in place of one of the other items of information. The described transmission leads to the receiver of the receiving telephone set being synchronized with the time slot so that, when a calling signal is sent, it will be received immediately.

If there is no telephone message to be sent, a fictitious message is sent instead, so constructed that it can keep the receiver in synchronization but is not confused with a true message. The synchronization is also utilized for current saving in the portable telephone set 4 so that its receiver 10 is adapted to be switched on only during the reception of the intended time slot, but is otherwise inactive.

Where several installations of the kind described are situated to close that they can disturb each other, they are coordinated in accordance with the present invention in a system of installations as illustrated in FIG. 1. For avoiding disturbance between the installations the repeated time frames of the separate installations are sent simultaneously, the requirement of simultaneousness, however, is only moderately severe. For this purpose, a transmitter (not shown), is arranged, i.e. in a central location, for transmitting a second synchronizing signal to be received by a synchronizing receiver 48 (FIG. 5) in each of the radio exchanges 6 via a connection 49 for synchronizing their time frames. In the example, the connection 49 is a radio transmission. In alternative systems, the connection is a wire.

All the radio transmitters in all the portable telephone sets 4 and in all the stationary units 5 in all installations in the entire system are adapted to send with the same frequency.

In a development, mobile telephones of a known kind may be used as portable telephones after they have been placed in a office provided with the installation described herein. For this, it is required that the mobile telephone, apart from transmitting and receiving at the frequencies at which the mobile telephones normally operate is also adapted for transmitting and receiving at the special frequency which is assigned to installations of the kind described herein, this special frequency being the same for all these installations.

Simplified installations with ony one stationary unit, connected directly to the subscriber line, may be used in dwellings. The same portable telephone set may be used in a dwelling as in the office should the telephone have two calling signal addresses.

What is claimed is:

1. An installation comprising at least two stationary units (5) each including a radio transmitter and a radio receiver with a relatively short range, a plurality of portable, wireless telephone sets (4) including a radio transmitter and a radio receiver with relatively short range for respectively exchanging telephone messages with one of the stationary units, the stationary units (5) each being adapted for simultaneously exchanging telephone calls with more than one of said portable telephone sets (4) over radio speech channels, adaptively selected amongst a plurality of radio speech channels common to all of said radio transmitters, (9, 31) and radio receivers (10, 32) and a radio exchange (6), to which said stationary units are connected, adapted for switching a telephone call with decreasing intelligibility between one of said portable telephone sets (4B) and one of said stationary units (5) to a telephone call with increasing intelligibility between the said one portable telephone set and another of said stationary units (5B).

2. An installation as claimed in claim 1, wherein all of the radio transmitters (9, 31) include means to send radio signalling on a calling signal channel common to all of the radio transmitters.

3. An installation as claimed in claim 2, wherein all the radio transmitters (9, 31) include means to transmit calling signals with time shift so that adjacent transmitters will not send calling signals simultaneously.

4. An installation as claimed in claim 1, wherein the portable, wireless telephone sets include means to give a signal on reception of a calling signal.

5. An installation as claimed in claim 1, wherein all the radio transmitters (9, 31) include means to send telephone messages on a radio speech channel selected from radio speech channels with different frequencies.

6. An installation as claimed in claim 1 wherein all the radio transmitters (9, 31) and the radio receivers (10, 32) include means for exchanging digitally coded telephone messages by means of a compressor (20, 41) included therein and coacting with each of the radio transmitters (9, 31) for time compressing of the speech signals and an expander included therein for (12, 42) coacting with each of the radio receivers (10, 32) for time expanding the speech signals, all the radio transmitters including means to send the telephone messages in at least one radio speech channel selected for each radio transmitter in the form of a time slot in a repeated time frame, modulated on a radio frequency common to all the radio transmitters, the time slot being assigned to each individual radio transmitter as needed.

7. An installation as claimed in claim 6, wherein the radio exchange (6) includes means to generate and receive on the baseband the combined time frames containing the digitally coded telephone messages (FIG. 5) and to transmit and to receive respectively the messages via a line (38) to each of the stationary units (5), and wherein the stationary units each include a synchronizer (35), adapted for controlling switching on and off the stationary unit transmitter (31), and in that the transmitter (31) is adapted to modulate the radio transmission with the digitally coded telephone messages and the radio receiver (32) to demodulate the received radio signals.

8. An installation as claimed in claim 1, wherein the stationary units (5), include means to transmit calling signals to the wireless telephone sets (4) on the radio speech channels which are in use for the moment, and in that the telephone sets include means to be locked, when in an inactive state, to one of the radio speech channels in use, the transmission of which is received in the telephone set with sufficient quality for receiving calling signals on this radio speech channel.

9. An installation as claimed in claim 8, wherein each stationary unit (5) includes means continuously to send messages on at least one radio speech channel, each said message being either a genuine telephone message or a fictitious message.

10. An installation as claimed in claim 9, wherein the portable telephone sets (4) include means to switch on the receivers (10) for a short duration during each time frame for receiving the message on one of the channels and to receive a calling signal and to switch off the receiver for the rest of the time.

* * * * *